April 24, 1951 M. P. WILDER 2,550,316

IMAGE STORAGE DEVICE

Filed Jan. 29, 1949 2 Sheets-Sheet 1

INVENTOR.
MARSHALL P. WILDER
BY Ralph W. E. Bitner
ATTORNEY

April 24, 1951 M. P. WILDER 2,550,316

IMAGE STORAGE DEVICE

Filed Jan. 29, 1949 2 Sheets-Sheet 2

INVENTOR.
MARSHALL P. WILDER
BY Ralph W. E. Bitner
ATTORNEY

Patented Apr. 24, 1951 2,550,316

UNITED STATES PATENT OFFICE 2,550,316

IMAGE STORAGE DEVICE

Marshall P. Wilder, Stamford, Conn., assignor to Remington Rand Inc., New York, N. Y., a corporation of Delaware Application January 29, 1949, Serial No. 73,592

5 Claims. (Cl. 313—66)

This invention relates to an image storage device which employs charged insulating areas and photoelectric elements to retain an image. It has particular reference to an image storage device which receives an image for a short time interval on a photoelectric cell mosaic and then reproduces the image for a long time on a fluorescent screen.

Several prior art devices have been used to retain or store an image. One such device uses a cathode ray television receiving tube with a screen made of potassium chloride crystals. The action of the scanning cathode ray alters the light transmitting properties of the screen and an image may be seen by transmitted light long after the cathode ray application. The image is erased by heat.

Another prior art storage device (Krawinkle) employs a cathode ray scanning beam to charge a mosaic by direct contact. Discrete islands of insulating material are formed on a photosensitive conducting plate which is kept at a negative potential. The cathode ray beam, modulated by image values, scans the island mosaic, the electron speed being slow enough to deposit negative charges on the surface of the non-conducting islands in proportion to the black and white values of the image. After a short scanning operation the mosaic is evenly illuminated by an infra-red lamp and the electron emission of the base plate is proportional per unit area to the charges on the islands. These electrons are focussed on a fluorescent screen and may be viewed for an extended period.

Both prior art devices require a scanning operation by a cathode beam and the initial exposure time must be long enough to permit a full scanning operation.

It is an object of this invention to provide an improved image storage device which avoids one or more of the disadvantages and limitations of prior art arrangements.

Another object of the invention is to provide an image storage device which may be used with X-ray machines wherein an exposure may be made in a very short time and then viewed for a much longer period of time.

Another object of the invention is to provide an image storage device which may be used with focussed light rays, permitting the prolonged study of images which have been projected for very short time intervals.

Still another object of the invention is to provide a combination instrument which includes both an image storage device and a cathode ray modulation device whereby an image of short duration may be converted into a television signal and transmitted to a television receiving station for an extended period of time.

One feature of the invention includes an image storage device for converting a transient light image into an electron image of long duration and comprises a photoelectric film mounted on a transparent plate for receiving a transient light image from an outside source. The electrons given off by the photoelectric surface are released by the transient image and are focussed by electric and magnetic means at a first electron image plane. At this plane a composite plate is mounted which includes an electron-permeable glass plate on the opposite side of which is a perforated conductive film. Small discrete particles of photoelectric material are deposited on the conductive film. A source of light is provided for illuminating the photoelectric material and a focussing means is used to focus the photoelectrons to a second image plane where a plate of fluorescent material is mounted to make the focussed photoelectrons visible for an extended period of time.

A second feature of the invention includes the above stated elements except that in place of the fluorescent material there is substituted a thin glass plate in front of which and adjacent to it is a conducting screen. A low velocity scanning means for scanning the glass plate is provided to convert the positively charged areas on the glass plate into a modulated television signal.

For a better understanding of the present invention, together with other and further objects thereof, reference is made to the following description taken in connection with the accompanying drawings.

Figures 1, 2, 3:
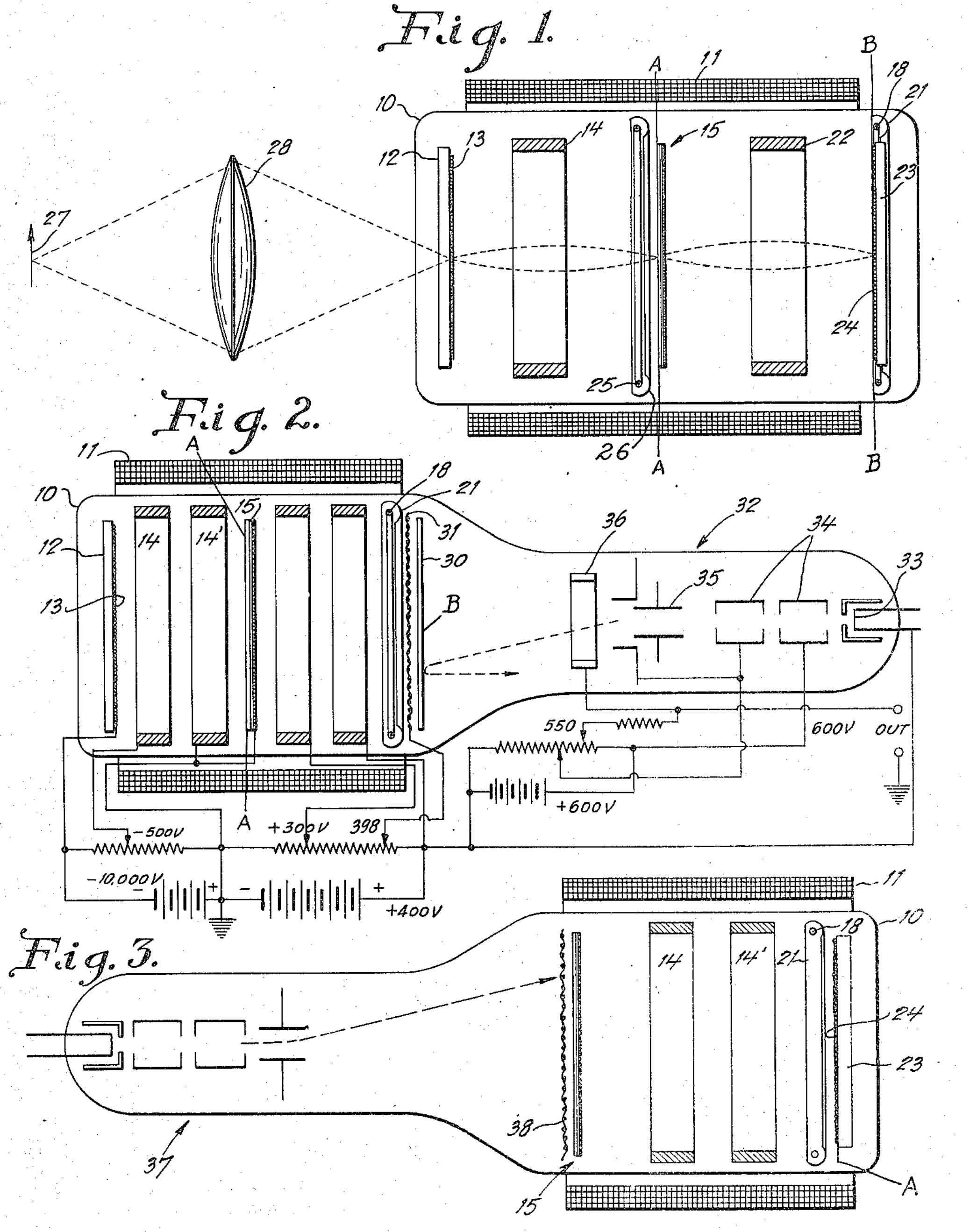
Fig. 1 is a cross sectional view (partly schematic) of one form of the invention wherein a transient light image is transformed to a persistent light image.
Fig. 2 is a cross sectional view (partly schematic) of another form of the invention wherein a transient light image is transformed to a persistent electron image for scanning by a cathode beam.
Fig. 3 is a cross sectional view (partly schematic) of still another form of the invention wherein a transient image, received by a modulated scanning cathode beam, is transformed into a persistent light image.

Referring now to Fig. 1, the image storage device comprises an evacuated chamber in a glass envelope 10 and an electromagnetic focussing coil 11. Each end of the envelope is composed of a plate of clear optical glass through which the light rays may pass without distortion. At the input end of the envelope a transparent plate 12 is mounted, the inside surface of which holds a film of photoelectric material 13.

Figure 4:
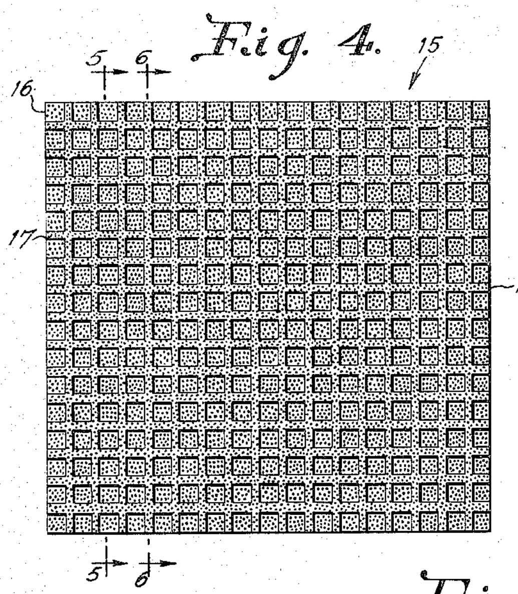
Fig. 4 is an enlarged plan view of a portion of the composite screen employed by all forms of the invention.
Figure 5:
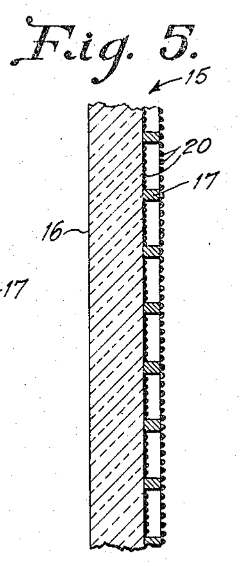
Fig. 5 is a cross sectional view of the composite screen of Fig. 4 taken along line 5—5 of that figure.
Figure 6:
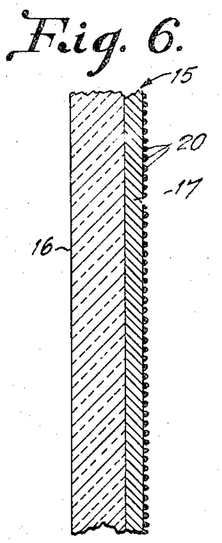
Fig. 6 is a cross sectional view of the composite screen of Fig. 4 taken along line 6—6 of that figure.

Concentric with the envelope and plate is a focussing electrode 14 which is given a high potential to aid in focussing electron streams radiating from the photoelectric film 13. In the image plane A of the electron beams a mosaic structure 15 is mounted. This structure (see Figs. 4, 5, and 6) comprises a thin electron-pervious insulating plate 16 which may be a glass film .0002 inch in thickness, stretched on a metal supporting ring. The insulating plate carries a perforated film of metal 17 which may be deposited thereon by any of the standard methods of forming fine metallic screens.

On the surface of the film there is deposited a large number of discrete photoelectric particles 20. The deposit is made by evaporating the photoelectric material from a filament 18 enclosed and shielded by a reflector 21. After the material has been deposited the structure 15 is heated until the photoelectric material breaks up into small drop-like particles due to surface tension. The photoelectric particles which are on the conducting film 17 provide a useful source of electrons for forming an image in a second electron image plane B. The drop-like particles which form on the surface of the insulating plate 16 do not contribute to the useful operation of the device but they do no harm and their presence is not objectionable.

An electrostatic focussing electrode 22 is mounted in the space between the mosaic structure 15 and the second electron image plane to aid in focussing the electron beams radiated by the photoelectric particles 20.

In the second electron image plane B a transparent plate 23 is mounted to hold a film of fluorescent material 24. The fluorescent material provides the light image which may be viewed through the plate 23 and the output end of the envelope 10. Fig. 1 also shows a filament 25 partly enclosed by a reflector 26 which is used to evaporate the photoelectric surface 13. It is used only when the device is under construction.

Voltage and current supply for the various units and electrodes is provided by external units which may consist of battery cells. None are shown in Fig. 1. Fig. 2 contains a schematic diagram of connections for similar electrodes and operating units with voltage values which may be used in one practical adaptation of the invention.

The operation of the image storage device shown in Fig. 1 is as follows: An illuminated object 27 is focussed by a lens or lens system 28 on the photoelectric film 13. Electrons are radiated from the film in proportion to the light received. The radiated electrons are under the influence of the electric field between film 13 and the perforated metallic film 17 (10,000 volts in Fig. 2). They are also under the influence of the magnetic field due to the electromagnetic coil 11 and the electric field due to the potential of focussing electrode 14. Proper adjustment of the voltage and current values cause the electron streams to be focussed on the electron-pervious insulating plate 16 (part of mosaic structure 15) and produce an electric charge on the plate which varies with the intensity and duration of the streams.

Since the electrons have considerable penetrating power and the plate 16 is thin, the charge spreads through the plate and appears on both sides. At the points where the perforated conducting plate 17 touches the plate 16 this charge will be cancelled since the conducting plate is at ground potential (see Fig. 2) but at all other areas the charge is negative and is retained on the plate 16 until removed by an erasing action or until it leaks off due to surface conduction. While the areas are charged, they act as elements of a coplanar control electrode and have considerable control on the emission of the photoelectric particles 20.

In order to provide a release for the electrons, a source of light is generated by heating the filament 18 by an electric current (source not shown) so that it provides a uniform illumination of the photoelectric particles. The electron emission is then proportional to the electric field in the immediate neighborhood of the particles and this field is controlled by the charge on the insulated areas on plate 16. The resulting emission is, therefore, proportional to the varying charges on this plate which are in turn proportional to the light and dark portions of the projected image on surface 13.

The electron streams from particles 20 are focussed on the fluorescent film 24 in the same manner as the first stream of electrons was focussed. The fluorescent film 24 produces a light image which may be seen or photographed through one end of the envelope 10.

It should be noted that the first electron image is established on the insulating plate 16 by the application of a transient optical image to the first photoelectric film 13. The duration of the optical image may be as short as one microsecond if the light intensity is enough to apply a resulting series of charges on the mosaic structure 15.

The formation of the picture on the fluorescent screen 24 is due to the emission of electrons from the photoelectric particles 20 and such emission is a continuous and lasting process since the electrons which leave the particles are replenished by the battery supply shown in Fig. 2. The picture of the transient image will, therefore, be retained on the fluorescent screen 24 as long as the electric charges are retained by the insulating areas on plate 16.

Fig. 2 shows an alternate arrangement whereby a transient light image may be transformed into a persistent television signal. The first photoelectric film 13 on the transparent plate 12, the focussing means, and the mosaic structure 15 are the same as in Fig. 1. (Fig. 2 shows two focussing electrodes 14 and 14′ instead of one to give greater flexibility in focussing control.) The electrons from the mosaic 15 are focussed in a second electron image plane B as before, but instead of being transformed into a light image, the electron streams are applied to a thin sheet of glass (.0002″) 30 in close proximity to a fine mesh screen 31. The electrons are provided with enough energy to release secondary electrons from the glass plate 30. This action produces a deficiency in electrons which results in a positive charge in proportion to the light and dark picture values. This positive charge quickly spreads through the glass to the opposite side and presents an area of varying positive charges to a cathode ray gun structure 32 which is the same as the well known image orthicon.

The gun structure 32 includes a cathode 33, focussing electrodes 34, deflection plates 35, and an output electrode 36. The electron beam from the gun is sufficient to neutralize slightly more than the highest local area charge on glass plate 30 and the remaining electrons in the beam return to the gun structure where they may be collected to form an output signal or they may be applied to the input electrode or first dynode of a multistage electron multiplier. The application of the output signal to a modulation device must obviously be synchronized with the scanning movement of the electron beam to produce a usable television signal.

Fig. 3 shows still another manner in which the image storage device may be used. In this case the transient picture is contained in the modulated wave of a television signal and the signal input must be long enough to make a complete scanning of the picture raster. An electron gun 37 is used to apply the modulated cathode ray beam to a mosaic structure 15 in close proximity to a fine screen 38. The mosaic structure 15 is identical to the forms shown in Figs. 4, 5, and 6. Focussing electrodes 14 and 14' act with the electromagnetic coil 11 to produce a focus on the fluorescent screen 24 on plate 23. The persistent picture may be viewed through he transparent plate 23 and the end of the tube. A single complete scanning of the picture raster in one thirtieth of a second is sufficient to charge the insulated areas of plate 16 in the mosaic structure to a potential where they may control the emission of the photoelectric particles and produce a lasting picture on the fluorescent screen 24.

Figure 7:
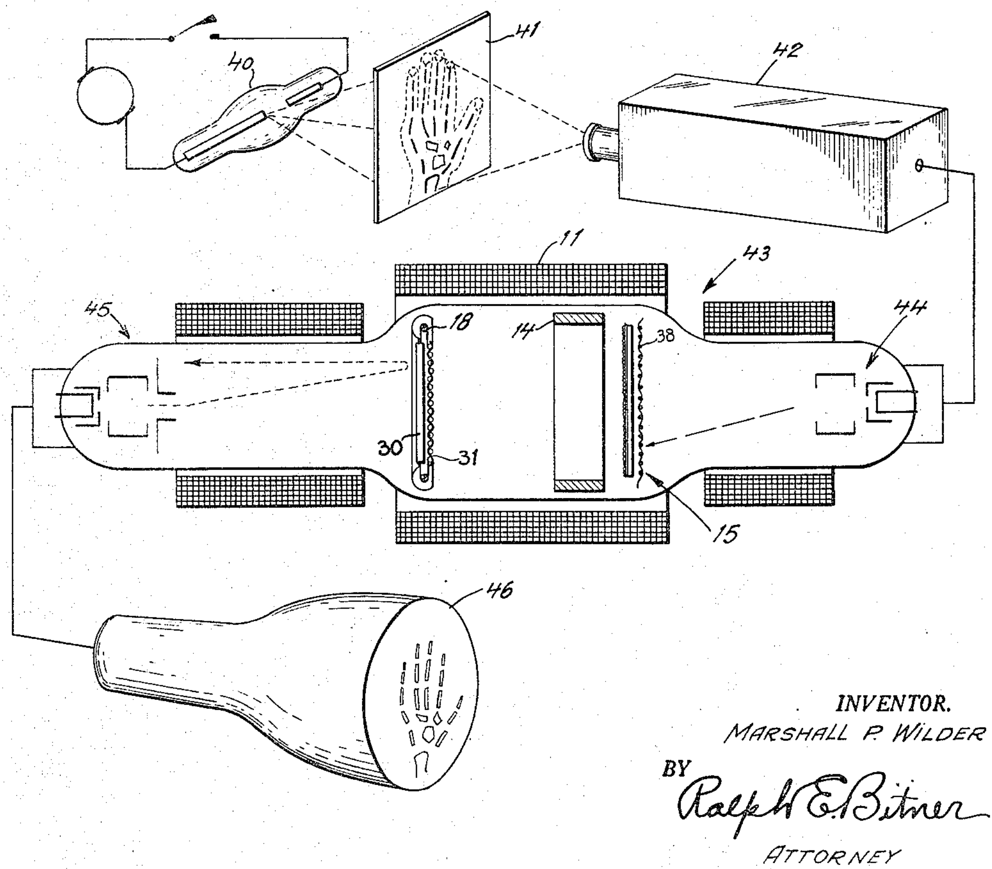
Fig. 7 is a schematic diagram, partly in section, indicating the arrangement of apparatus for converting a transient X-ray image into a light image of long duration.

The arrangement in Fig. 7 illustrates how a transient picture may be received through a modulated cathode ray scanning beam at one end of a tube and be converted into a lasting picture signal by means of a second cathode ray scanning beam. The scanning frequencies may be different from each other and do not necessarily operate at the same time. In the figure an X-ray tube 40 forms an image on a fluorescent film 41 which is picked up by an ordinary television camera 42. The resultant signal is applied to an image storage tube 43 and is converted to a picture of charges on a mosaic 15 by a scanning cathode ray from an electron gun 44. A focussing coil 11 and a focussing electrode 14 focus the resulting electron streams on the glass plate 30 through the fine mesh screen 31. An image orthicon type of television gun 45 scans the charged plate as has been described in connection with Fig. 2, and a modulated television signal is produced which may be sent to a television picture tube 46. A picture will be produced which will be persistent (lasting for several minutes to an hour) and have the same qualities as the original X-ray image which was in existence for a time interval equal to one complete scanning operation of the first television system.

Image storage devices which automatically retain the image for a long time are useful only if a means of quick and positive erasure is available. Otherwise the device would be useless for long periods of time while the image slowly disappeared.

In the present invention erasure may be easily effected by removing the negative charges from the small insulated areas in the mosaic structure 15. This may be accomplished by directing a large number of high speed electrons at the mosaic. The electron velocity must be such that the secondary emission ratio is greater than unity. Then the charge will be neutralized almost instantly by the secondary emission electrons and leave the insulated areas at zero charge or slightly positive.

In the structures shown in Figs. 1, 2, 3, and 7, such secondary emission may be obtained by switching about 1000 volts between the hot filament 18 and the mosaic 15 with the mosaic positive.

From the above description it will be evident that the invention may be employed in a number of arrangements to convert a short duration transient image or signal into an image or signal of long duration.

While there have been described and illustrated specific embodiments of the invention, it will be obvious that various changes and modifications may be made therein without departing from the field of the invention which should be limited only by the scope of the appended claims.

What is claimed is:

1. An image storage device for converting a transient light image into a persistent electron image comprising, a photoelectric film mounted on a transparent plate for receiving a transient light image from an outside source, focussing means for directing electrons given off by the photoelectric film to a focus at an electron image plane, an electron permeable insulating plate mounted in said image plane, a perforated conductive film mounted on said insulating plate, particles of photoelectric material secured to the surface of the conductive film, and a source of light directed towards the conductive film for illuminating the photoelectric material.

2. An image storage device for converting a transient light image into a persistent electron image comprising, a photoelectric film mounted on a transparent plate for receiving a transient light image from an outside source, focussing means for directing electrons given off by the photoelectric film to a focus at a first electron image plane, an electron permeable insulating plate mounted in said image plane, a perforated conductive film mounted on said insulating plate, particles of photoelectric material secured to the surface of the conductive film, a source of light directed toward the conductive film for illuminating the photoelectric material, focussing means for directing electrons given off by the photoelectric material to a focus at a second electron image plane, and a film of fluorescent material mounted in the second electron image plane on a transparent plate for transforming electron energy into light rays.

3. An image storage device for converting a transient light image into a persistent electron image comprising, a photoelectric film mounted on a transparent plate for receiving a transient light image from an outside source, focussing means for directing electrons given off by the photoelectric film to a focus at an electron image plane, said focussing means comprising the combination of an electromagnetic coil and one or more conductive ring electrodes for producing an electric field, an electron permeable insulating plate mounted in the image plane for receiving electrons on one side thereof, a perforated conducting film mounted on the other side of said insulating plate, particles of photoelectric material secured to the surface of the conductive film, and a source of light directed toward the conductive film for illuminating the photoelectric material to cause electrons to be liberated in proportion to the number of electrons received from the photoelectric film.

4. An image storage device for converting a transient light image into a persistent electron image comprising, a photoelectric film mounted on a transparent plate for receiving a transient light image from an outside source, focussing means for directing electrons given off by the photoelectric film to a focus at a first electron image plane, said focussing means comprising the combination of an electromagnetic coil and one or more conductive ring electrodes for producing an electric field, an electron permeable insulating plate mounted in said image plane, a perforated conductive film mounted on the insulating plate, particles of photoelectric material secured to the surface of the conductive film, a source of light directed toward the conductive film for illuminating the photoelectric material, focussing means for directing electrons given off by the photoelectric material to a focus at a second electron image plane, said focussing means comprising the combination of an electromagnetic coil and one or more conductive ring electrodes for producing an electric field, and a film of fluorescent material mounted in the second electron image plane on a transparent plate for transforming electron energy into light rays.

5. An image storage device for converting a transient light image into a persistent electron image comprising, a photoelectric film mounted on a transparent plate for receiving a transient light image from an outside source, focussing means for directing electrons given off by the photoelectric film to a focus at a first electron image plane, an electron permeable insulating plate mounted in said image plane, a perforated conductive film mounted on the insulating plate, particles of photoelectric material secured to the surface of the conductive film, a source of light directed toward the conductive film for illuminating the photoelectric material, focussing means for directing electrons given off by the photoelectric material to a focus at a second electron image plane, a thin barrier sheet of insulating material mounted in the second electron image plane for producing a positively charged area when struck by high voltage electrons, and a scanning cathode ray device for determining the values of said charged areas and for modulating a current in accordance with said values.

MARSHALL P. WILDER.

REFERENCES CITED

The following references are of record in the file of this patent:

UNITED STATES PATENTS

| Number | Name | Date |
|---|---|---|
| 2,159,568 | Ploke | May 23, 1939 |
| 2,258,294 | Lubszynski et al. | Oct. 7, 1941 |
| 2,401,786 | Law | June 11, 1946 |